United States Patent
Stevens et al.

(10) Patent No.: US 8,623,315 B2
(45) Date of Patent: Jan. 7, 2014

(54) METHODS FOR PREPARING COMPOSITIONS COMPRISING AMMONIUM NITRATE DOUBLE SALTS

(75) Inventors: Carl John Stevens, Lake Forest, IL (US); Gavin P. Towler, Inverness, IL (US); James Kweeder, Chesterfield, VA (US)

(73) Assignee: Honeywell International Inc., Morristown, NJ (US)

( * ) Notice: Subject to any disclaimer, the term of this patent is extended or adjusted under 35 U.S.C. 154(b) by 929 days.

(21) Appl. No.: 12/499,617

(22) Filed: Jul. 8, 2009

(65) Prior Publication Data

US 2010/0047149 A1 Feb. 25, 2010

Related U.S. Application Data

(60) Provisional application No. 61/080,891, filed on Jul. 15, 2008.

(51) Int. Cl.
*C01C 1/18* (2006.01)

(52) U.S. Cl.
USPC .......................................................... 423/396

(58) Field of Classification Search
USPC ............................................. 423/396; 71/59
See application file for complete search history.

(56) References Cited

U.S. PATENT DOCUMENTS

| | | | |
|---|---|---|---|
| 6,344,066 B1 | 2/2002 | Eyal | |
| 6,689,181 B2 | 2/2004 | Highsmith et al. | |
| 2002/0095966 A1 | 7/2002 | Highsmith et al. | |
| 2004/0156775 A1 | 8/2004 | Bichel et al. | |
| 2007/0199357 A1 | 8/2007 | Kweeder et al. | |

FOREIGN PATENT DOCUMENTS

| | | |
|---|---|---|
| EP | 1595860 A2 | 11/2005 |
| EP | 1 923 376 A2 | 5/2008 |
| GB | 1259778 A | 1/1972 |
| PL | 85766 B1 | 4/1976 |
| RU | 2227792 C1 | 4/2004 |
| RU | 2279416 C2 | 7/2006 |

OTHER PUBLICATIONS

Adams et al., "Hygroscopicity of Fertilizer Materials and Mixtures," 1929, Industrial and Engineering Chemistry, 21 (4), pp. 305-307.*
"Ammonium sulfate nitrate, a new German nitrogenous fertilizer," Experiment Station Record (US Department of Agriculture), 1920, 44, 216 (Abstract only).
V.A. Sokolov, "The equilibrium and formation of complexes in the system H2O-NH4NO3-(NH4)2SO4," Bull. Acad. Sci. URSS, Classe Scl. Math. Nat, Ser, Chim., 1938, No. 1, 123-35 (Abstract only).

(Continued)

*Primary Examiner* — Melvin C Mayes
*Assistant Examiner* — Stefanie Cohen
(74) *Attorney, Agent, or Firm* — Faegre Baker Daniels LLP

(57) ABSTRACT

Methods for the production of ammonium sulfate nitrate include (a) providing at a temperature of less than about 175° C. a melt including ammonium nitrate, ammonium sulfate, and water and the water content is greater than about 2 wt % based on the total weight of ammonium nitrate, ammonium sulfate and water in the melt, and (b) solidifying from the melt 1:2 ANS double salt by cooling at least a portion of the melt at a rate of less than about 100° C./min.

20 Claims, 4 Drawing Sheets

(56) References Cited

OTHER PUBLICATIONS

R.K. Bahl et al., "Ternary system: NH4NO3-(NH4)2SO4-H2O at 25°," Journal of the Indian Chemical Society, 1941, 18, 307-8 (Abstract only).

Jan Turlej, "Methods for production and physicochemical properties of ammonium nitrate sulfate," Przemysi Chemiczny, 1976, 55(12), 611-14 (Abstract only).

\* cited by examiner

METHODS FOR PREPARING COMPOSITIONS COMPRISING AMMONIUM NITRATE DOUBLE SALTS

RELATED APPLICATION

This application claims priority of U.S. Provisional Application No. 61/080,891, filed Jul. 15, 2008, hereby incorporated by reference.

TECHNICAL FIELD

This disclosure relates to processes for production of compositions comprising one or more ammonium nitrate double salts.

BACKGROUND

It is well known that, because of its high concentration of nitrate ions, ammonium nitrate (including double salts comprising ammonium nitrate) has important uses in the field of agriculture in general and fertilization in particular. However, it is also well known that ammonium nitrate, in many of the forms in which it has heretofore been commonly used, is relatively difficult and potentially hazardous to handle commercially in large amounts, and/or to store in great masses (such as occur in commercial warehouses and storage bins), especially for relatively long periods of time. Furthermore, it has been known that many of the forms of ammonium nitrate heretofore commonly used have had a tendency to detonate under relatively mild conditions, and have therefore sometimes been abused and misused as an explosive material.

Additionally, because of its detonation potential, many processes for producing such materials are used under conditions that make the process more susceptible than is desirable to detonation hazard. In addition, certain prior processes utilize conditions that are relatively expensive to operate and/or are less efficient than is desired.

For example, one method commonly used is based on the formation of a melt comprising ammonium nitrate, ammonium sulfate and water. That process is disclosed in U.S. Pat. No. 6,689,181, the subject matter of which is incorporated herein by reference. The method disclosed in '181 comprises charging materials comprising ammonium sulfate particles, ammonium nitrate and water to a melting vessel using a molar ratio of ammonium sulfate to ammonium nitrate of about 0.9:1 to about 1.1:1. '181 discloses that the water should be charged to the vessel in an amount that is more than 2 wt % and up to about 10 wt % of the charged materials. The charge is then processed by melting the ammonium nitrate and dissolving at least a portion of the ammonium sulfate particles at a temperature of about 180° C. to about 210° C. The melt is then reacted at a temperature of about 180° C. to about 210° C. The reaction product is then solidified by cooling at a rate of greater than 100° C. per minute.

A disadvantage of '181 is that relatively high temperatures (180° C. to 210° C.) are specified for forming the melt of ammonium nitrate and ammonium sulfate and these temperatures begin to approach the decomposition temperature of ammonium nitrate. Decomposition reactions result in the production of nitrogen oxides in the melt and, therefore, they can cause the resulting solid to have increased porosity and softness, which is generally a disadvantage when producing a relatively non-hazardous fertilizer. Moreover, at such relatively high processing temperatures, the chances of unwanted decomposition of nitrates with accompanying formation of nitrogen oxides increase considerably. This causes loss of nitrogen in the final product. Also, the relatively high decomposition possibility increases the chances of violent reaction, deflagration, and/or explosion during processing, which increases the risk to the health, life and/or property of plant works and residents of the surrounding communities.

Another disadvantage in '181 relates to the relatively long reaction times and rapid cooling rates to achieve solidification. The relatively long reaction time at relatively high reaction temperature also increases the risk of decomposition and the long reaction times, together with rapid cooling rates, can increase the cost of the process.

Another melt-based process is disclosed in EP1923376. The process involves producing ammonium nitrate sulfate in a multistage reaction system which comprises a mixing stage and a granulation stage followed by a drying stage. Ammonium nitrate sulfate suspension in '376 is said to be prepared in a continuous process by feeding ammonium nitrate melt, dolomite and ammonium sulfate into the reactor. Dolomite addition in the reaction system is said to stabilize ammonium nitrate and prevent its decomposition in the reaction medium.

A deficiency of '376 relates to the use of water in a melt at below 1% by weight. This feature, as well as other features, is detrimental in that the process is not conducive to the formation of the desirable 1:2 ANS double salt.

SUMMARY

We thus provide methods for forming ammonium nitrate compositions comprising ammonium nitrate and at least a second compound, preferably ammonium sulfate, wherein the second compound is present under conditions and in amounts effective to substantially reduce the detonation sensitivity of the composition and/or to otherwise improve a desired property of the composition.

We provide a method for producing ammonium sulfate nitrate including (a) providing, at a temperature of less than about 175° C., a mixture including ammonium nitrate (AN), ammonium sulfate (AS), and water at a water content based on the total weight of ammonium nitrate, ammonium sulfate and water in the mixture such that at least about 0.5 wt % water is present during subsequent solidification; and (b) forming from the mixture 1:2 ammonium nitrate sulfate (ANS) double salt by cooling at least a portion of the mixture at a rate of less than about 100° C./min.

We also provide a method for the production of ammonium sulfate nitrate including (a) introducing into a vessel ammonium nitrate, ammonium sulfate and water in amounts such that the ammonium sulfate:ammonium nitrate molar ratio is from about 0.9:1 to about 1.1:1 and the water content is from about 2 wt % to about 24 wt % based on the total weight of ammonium nitrate, ammonium sulfate and water introduced into the vessel to form a mixture; (b) heating the mixture at a temperature of less than about 175° C.; and (c) crystallizing from the mixture a substantially homogeneous 1:2 ANS double salt by cooling at least a portion of the mixture at a rate of less than about 90° C./min.

BRIEF DESCRIPTION OF THE DRAWINGS

FIG. 5 is a graph of the relationship between water concentration temperature at pH$_2$O for an equimolar mixture of AN and AS.

FIG. 6 is a graph of the relationship between particle size and cooling rate for an equimolar mixture of AN and AS.

DETAILED DESCRIPTION

Figure 1:
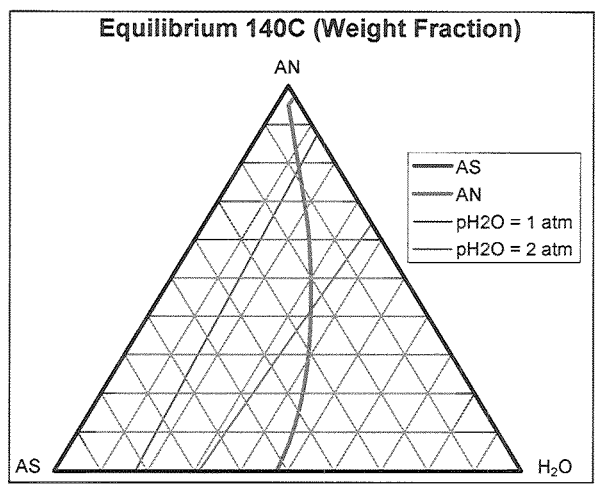
FIG. 1 is a diagram of a ternary system at 140° C.

It will be appreciated that the following description is intended to refer to specific representative examples of our compositions and methods and is not intended to define or limit the disclosure, other than in the appended claims.

We found that advantages can be unexpectedly achieved by proceeding in an manner contrary to the teachings of the prior art. More specifically, we found that advantageous ANS materials can be made from a process that utilizes temperature and/or reaction temperature of less than 180° C., particularly less than about 175° C. We found that our methods are improved in terms of safety, efficacy and economy for producing a relatively non-explosive ammonium sulfate nitrate composite material comprising, preferably as measured by x-ray diffraction analysis, about 14 wt % to about 35 wt % ammonium sulfate (($NH_4$)$_2$$SO_4$); about 60 wt % to about 85 wt % (($NH_4$)$_2$$SO_4$)2($NH_4$$NO_3$) double salt; and 0 to about 5 wt % in combined total (($NH_4$)$_2$$SO_4$)3($NH_4$$NO_3$) double salt and ammonium nitrate ($NH_4$$NO_3$). The composites may be useful as fertilizers, have reduced moisture sensitivity, are not considered hazardous materials under Title 49 of the Code of Federal Regulations, "Transportation," Part 172, "Hazardous Materials Table," Oct. 1, 2000, and are not classified as oxidizers under United Nations Recommendations on the Transport of Dangerous Goods, Manual of Tests and Criteria, 1995," "Section 34, Classification Procedures, Test Methods and Criteria Relating to Oxidizing Substances of Division 5.1."

We thus provide methods for the production of ammonium sulfate nitrate comprising: (a) providing, at a temperature of less than about 175° C., a mixture comprising ammonium nitrate, ammonium sulfate, and water wherein the water content is greater than about 2 wt % based on the total weight of ammonium nitrate, ammonium sulfate and water in the mixture; and (b) reacting at least a portion of the ammonium nitrate and the ammonium sulfate in the mixture to form 1:2 ANS double salt; and (c) cooling at least a portion of the mixture containing the 1:2 ANS double salt at a rate of less than about 100° C./min to produce a solid composite. The ammonium sulfate:ammonium nitrate molar ratio in the mixture as formed may be from about 0.9:1 to about 1.1:1, although broader molar ratios may be employed.

The methods may also comprise: (a) introducing into a vessel ammonium nitrate, ammonium sulfate and water, wherein the water content is greater than about 2 wt % based on the total weight of ammonium nitrate, ammonium sulfate and water introduced into the vessel to form a mixture; (b) heating the mixture at a temperature of less than about 175° C.; and (c) forming, preferably at least in part by crystallizing from the mixture a substantially homogeneous 1:2 ANS double salt by cooling at least a portion of the mixture at a rate of less than about 100° C./min.

Our methods may utilize relatively large particle sizes such as about 0.5 mm to about 5 mm for the ammonium nitrate charged to the mixture. The ability to effectively use such large particle sizes for ammonium nitrate is due, at least in part, to the use of low reaction temperatures as specified herein and/or the use of high water concentration in the mixture.

Our methods may utilize a relatively high concentration of water in the charge. The ability to effectively use the high water content is due, at least in part, to the use of low reaction temperatures as specified herein and/or the use of relatively large ammonium nitrate particle sizes.

In those cases where we do use relatively high levels of water, one or more hydrate-forming salts may be added to the reaction mixture and/or the process during solidification and/or drying. For example, selected metal salts such as ferric and aluminum salts are capable of forming hydrates. In this way, such metal salts act as water scavenging agents, which in turn, therefore, reduce the amount of free water in the resulting product.

The second compound may be selected from the group consisting of ammonium sulfate, ammonium phosphate, calcium nitrate, potassium nitrate, magnesium nitrate, ammonium molybdenate, ammonium hexaflouralsilicate, neodymium hydroxynitrate, combinations of two or more of these as well as others. At least a substantial portion of the ammonium nitrate in the composition may be in the form of a double salt with one or more of the second compounds. In particular, the compositions may consist essentially of one or more double salts of ammonium nitrate and a second compound as described herein.

We also provide methods for reducing the sensitivity to detonation of compositions containing ammonium nitrate by including in such compositions one or more additional compounds effective to substantially reduce detonation sensitivity of the composition, the additional compound preferably being selected from the group consisting of ammonium sulfate, ammonium phosphate, calcium nitrate, potassium nitrate, magnesium nitrate, ammonium molybdenate, ammonium hexaflouralsilicate, neodymium hydroxynitrate, and combinations of two or more of these. The one or more additional compounds may be incorporated into the composition under conditions effective to produce at least one double salt of ammonium nitrate and one more of the additional compounds.

We further provide compositions, and preferably a fertilizer, comprising ammonium nitrate in combination with at least a second compound selected from the group consisting of ammonium sulfate, ammonium phosphate, calcium nitrate, potassium nitrate, magnesium nitrate, ammonium molybdenate, ammonium hexaflouralsilicate, neodymium hydroxynitrate, and combinations of two or more of these. The combination of ammonium nitrate and the at least a second compound may comprise a double salt of ammonium nitrate and at least one of the second compounds. The preferred compositions exhibit a reduced sensitivity to detonation relative to compositions consisting essentially of ammonium nitrate.

As used herein, the term "ammonium nitrate composition" refers broadly to compositions which contain ammonium nitrate in any form, including as double salt with other compounds.

As used herein, the term "double salt" refers to a salt made up of at least two different types of cations and one type of anion or of at least two different types of anions and one type of cation. These chemical compounds may be composed of ions from two precursor compounds whose crystal structure is distinct from those of the precursor compounds. The molar ratio of precursor compounds in a double salt is in the proportion of small integers, e.g., 1:2, and is not continuously variable as in a solid solution. Thus, the term "double salt of ammonium nitrate" means a combination of ammonium nitrate and another compound in such a way as to form new compound which may be crystaligraphically distinct from either of the constituents.

Our methods may produce compositions, including fertilizers and other materials, having a relatively low concentration of single salt ammonium nitrate. As used herein the term "single salt ammonium nitrate" refers to a salt in which substantially all of the cations are ammonium and substantially all of the anions are nitrate. The methods may produce compositions and materials having no substantial amount of single salt ammonium nitrate and, in some instances, the compositions contain not more than trace amounts of single salt ammonium nitrate.

We provide compositions preferably having desirable agricultural properties such as would be used in fertilizers and the like, and a high detonation resistance in comparison to single salt ammonium nitrate. We provide methods of making fertilizer compositions comprising one or more double salts of the formula (I):

$$(CAT\text{-}ANI).n(NH_4NO_3).m(H_2O) \qquad (I)$$

where

CAT-ANI may be a cation-anion pair selected from the group consisting of ammonium sulfate, ammonium phosphate, calcium nitrate, potassium nitrate, magnesium nitrate, ammonium molybdenate, ammonium hexaflouralsilicate and neodymium hydroxynitrate, n is from about 0.2 to about 3, and m is from about 0 to about 10.

We provide methods which may produce ammonium nitrate sulfate composite materials comprising about 60 to about 100 wt % of product produced; about 5 wt % to about 35 wt % ammonium sulfate; about 60 wt % to about 90 wt % 1:2 ANS double salt and 0 to about 5 wt % 1:3 ANS double salt; about 5 to about 35 wt % unreacted AS and 0 to about 5 wt % unreacted AN. Preferably, the combined total of 1:3 ANS double salt and ammonium nitrate in the ammonium sulfate nitrate composite material produced by our methods is 0 to about 3 wt %. More preferably, the ammonium nitrate is about 0 to about 1 wt %.

The composite product produced by the methods preferably comprises small ammonium sulfate crystals imbedded in a matrix of the other constituents. The composite material may be distinguished from a mixture of free particles. The bulk of the ammonium sulfate crystals are approximately the same size as the initial ammonium sulfate particles, but upon formation, about 5 wt % precipitate as crystals of less than about 2 micrometer dimension. The crystals of ammonium sulfate are dispersed in the matrix in a substantially uniform manner. The small size and uniform dispersion of the ammonium sulfate crystals in the 1:2 double salt significantly enhance the stability of the product against detonation hazard.

Less than about 5 wt % of the product produced may consist of the hazardous ammonium nitrate or 1:3 double salt species.

The ammonium sulfate and the ammonium nitrate used to form the composites may be fertilizer grade materials of at least about 90 wt % purity. Preferably, the ammonium sulfate and the ammonium nitrate are of at least about 95 wt % purity. More preferably, the ammonium sulfate and ammonium nitrate are of at least 97 wt % purity. Because of the hazards of mixing organic materials with ammonium nitrate, it is highly desirable that neither the ammonium sulfate nor the ammonium nitrate contains more than about 0.2 wt % organic impurities. Ammonium sulfate is commercially available from Honeywell International Inc.

The particle size of the ammonium nitrate used to form the melt is generally not critical but, preferably, about 95 wt % of the ammonium nitrate particles pass a Tyler No. 6 sieve (3.36 mm opening).

The particle size of the ammonium sulfate can be important. Although we do not intend to be bound by any particular theory of operation, we believe, based on test results, that the reaction of ammonium nitrate and ammonium sulfate under selected conditions occurs rapidly through the 1:3 ANS double salt and forms 1:2 ANS double salt. We also believe that, contrary to the implications in the prior art, such a reaction occurs relatively quickly even under our reduced reaction temperature conditions. As a result, we believe that relatively large AS particles may be used effectively. Thus, while in certain circumstances a smaller particle is preferred, such as ammonium sulfate particles which are at least about 85 wt % passable through a Tyler No. 48 sieve (0.30 mm opening), in preferred circumstances the ammonium sulfate charged to the mixture is less than 85 wt % passable through a Tyler No. 48 sieve (0.30 mm opening), more preferably less than 75 wt % passable through a Tyler No. 48 sieve, and even more preferably less than 65 wt % passable through a Tyler No. 48 sieve.

The composites may be formed by reacting ammonium sulfate with ammonium nitrate in a molar ratio of about 0.9:1 to about 1.1:1, preferably in the presence of a relatively large amount of water and over a low range of temperatures and then cooling to solidification at a relatively slow rate.

The method may be carried out in a continuous process.

The method may include forming an ammonium nitrate sulfate material comprising the steps of: (a) charging materials comprising ammonium sulfate particles, ammonium nitrate and water to a reaction device, wherein the molar ratio of ammonium sulfate to ammonium nitrate is about 0.9:1 to about 1.1:1 and the water is more than 2 wt % of the charged materials, more preferably from about 2 wt % to about 24 wt %, and even more preferably from greater than 10% to about 24 wt %; (b) heating the ammonium nitrate and dissolving at least a portion of the ammonium sulfate particles at a temperature of less than about 175° C., and even more preferably less than about 170° C., less than about 160° C., less than about 150° C. or 140° C. or even lower; (c) reacting the charged materials at a temperature of about less than about 175° C., and even more preferably less than about 170° C.; and (d) crystallizing/solidifying the product at a cooling rate of less than about 100° C. per minute, preferably less than about 90° C. per minute, and even more preferably less than about 80° C. per minute.

The time provided for the reaction between the ammonium sulfate should be sufficiently long to permit dissolution of the second salt, preferably the ammonium sulfate, which may be a function of the particle size and the amount of the ammonium sulfate, the degree of agitation of the mixture, the amount of water in the mixture and the temperature of the mixture. The temperature provided for the reaction similarly only needs to be high enough to permit dissolution of the second salt.

It is preferred for agricultural purposes that the products are in the form of free-flowing prills. Thus, the solidification step of the method may be conducted in a prilling tower.

Water is an essential constituent of the reaction mixture. We found that there appears to be an abrupt change in the proportions of 1:2 and 1:3 double salts in the product when the water content of the charge exceeds about 2 wt % and when the melt and reaction temperatures as described herein are used. When the water is less than about 2 wt % of the charged materials, the more hazardous 1:3 double salt tends to be formed in preference to the desired 1:2 double salt and more ammonium nitrate remains unreacted.

The manner in which the water is charged to the reaction mixture is not critical. The water may be charged as a liquid, or it may be incorporated in the ammonium sulfate, the ammonium nitrate, or both, as absorbed moisture. We found that charging at least about 2 wt % of water helps the amount of water present at solidification to be at a minimum of at least about 0.5 wt %. This facilitates production of the 1:2 double salt and accounts for evaporation and other water loss.

Without being held to a particular theory, we believe that the ammonium sulfate in an equal molar mixture of ammonium sulfate and ammonium nitrate is incompletely soluble in the ammonium nitrate in the absence of water. This limits the reaction of the ammonium sulfate with the ammonium nitrate, tends to leave residual ammonium nitrate and, therefore, favors formation of the 1:3 double salt. When water is added to the charge, it is believed that ammonium sulfate solubility in the ammonium nitrate is enhanced, thereby favoring complete reaction of the ammonium nitrate with the ammonium sulfate and formation of the 1:2 double salt during and/or following solidification. Details of our findings are set forth below.

Producing ammonium nitrate sulfate (ANS) can theoretically include an ionic mixture with ammonium nitrate, ammonium sulfate and water. The system can have 4 solid phases, AS, AN, and double salts, $(AN)_2AS$ and $(AN)_3AS$ (abbreviated 1:2 and 1:3, respectively).

Figure 2:
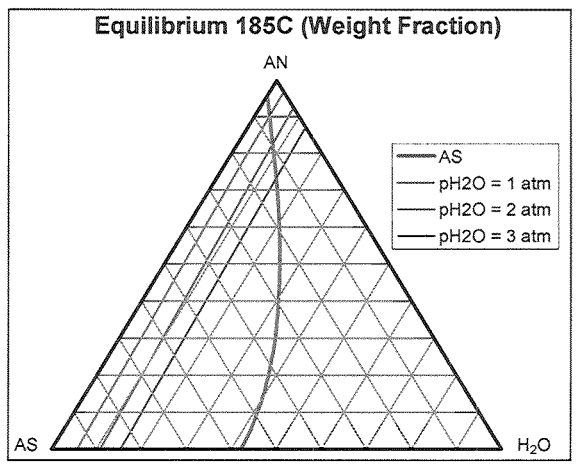
FIG. 2 is a diagram of a ternary system at 185° C.

We found that the ternary system, extrapolated to higher temperatures, produced the phase diagrams in FIGS. 1 and 2. At 140° C., the 1:3 double salt is no longer a stable phase and we believe that the 1:2 double salt is just becoming unstable relative AS and AN. At 185° C., AS is the only solid phase that is stable. Thus, temperatures of less than about 175° C. are particularly effective to produce the 1:2 ANS double salt. The isobar of 1 atm water is significant because it shows the highest level of water that can be retained in the melt during processing in an open vessel.

Based on the phase diagram of FIGS. 1 and 2, it appears that there is very little reaction occurring at the reaction conditions and that AS dissolves and results in concentrations in the melt of less than 10 wt %. It can be seen that significant amounts of solid AS are converted to the 1:2 double salt during cooling. Having water present lowers the temperature at which the salt exists during quenching. Salt can play a key role in the transformation of AS and a salt mixture into the 1:2 double salt during cooling.

One limiting case is very slow cooling, where all phases tend to remain in equilibrium. Under those conditions, the AS in the liquid phase is in equilibrium with the $AS_{solid}$ which is present in excess. As the mixture is cooled, other crystal phases, either the 1:2 salt ($AN_2AS$), the 1:3 salt ($AN_3AS$) or $AN_{solid}$, form depending on which are the most stable. FIGS. 1 and 2 show that in the presence of excess $AS_{solid}$, that the 1:2 salt is the preferred solid.

Figure 3:
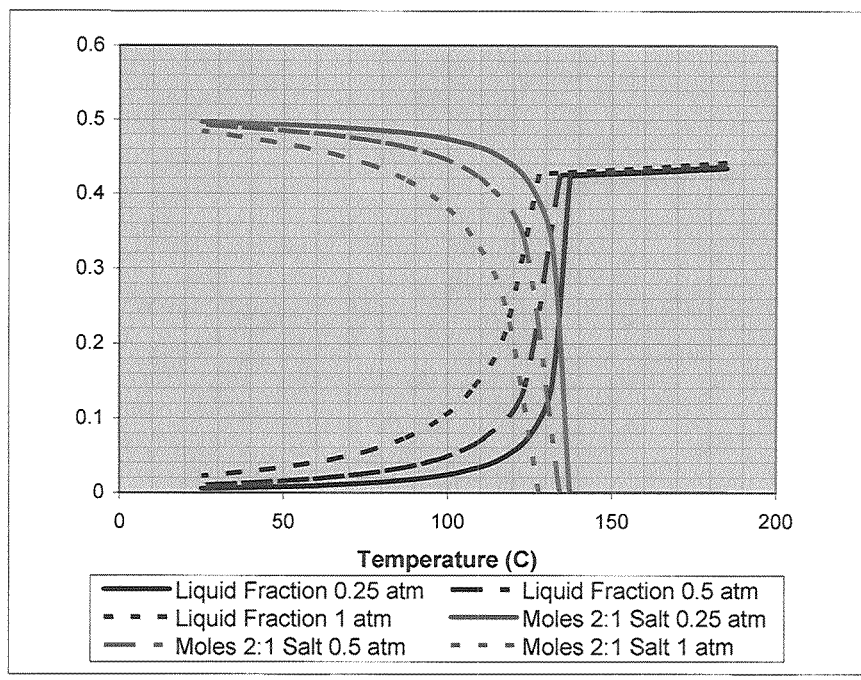
FIG. 3 is a graph of water concentrations as a function of temperature for a mixture of 1 mole of AN and 1 mole of AS at equilibrium.

As noted above, one variable is the amount of water. FIG. 3 shows the formation of solid phases for slow (equilibrium cooling). There are three separate curves corresponding to water present at levels that are in equilibrium with 0.25, 0.5, and 1 atm of water in the vapor phase. FIG. 3 also shows the amount of liquid present for each case. The mixture has a ratio of AS:AN that is below 0.5. Therefore, AS dissolves from $AS_{solid}$ and combines with the mixture to form the 1:2 salt. Thus, both the amount of liquid and the size of the AS particles can be important when the rate of cooling of the sample is increased. Having smaller AS particles (with increased surface area) facilitates the transfer of AS from the AS solid phase to the crystallizing 1:2 salt. Higher volume fractions of liquid facilitate transfer of AS from the solid phase to the surface of crystallizing 1:2 salt since it makes more of the surface of the $AS_{solid}$ and 1:2 salt accessible to the mixture. FIG. 3 shows the advantage of having higher levels of water in the mixture. The increased levels of water increase the temperature range over which the crystallization occurs and this allows faster cooling rates.

Figure 4:
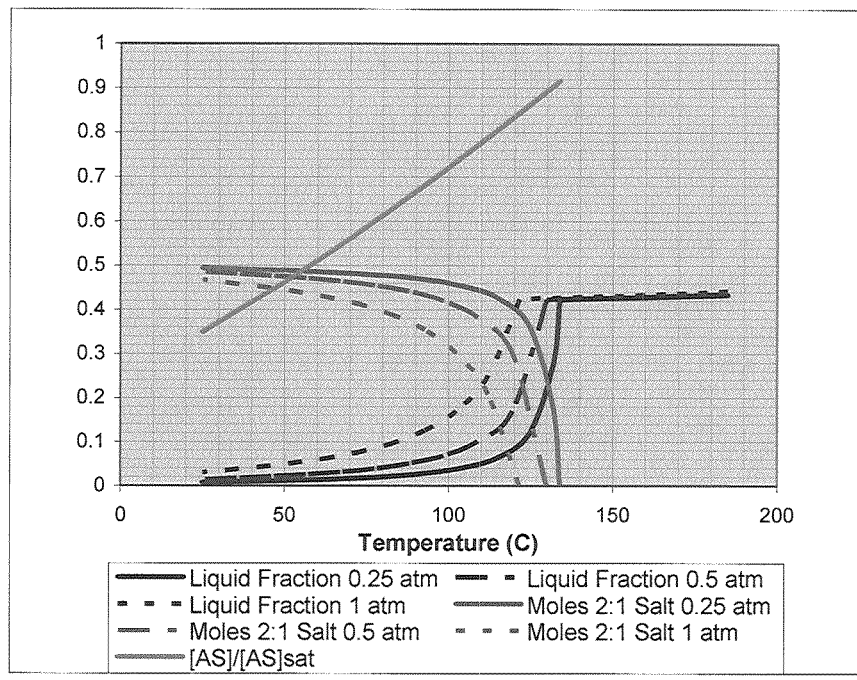
FIG. 4 is a graph of water concentrations as a function of temperature for a mixture of 1 mole of AN and 1 mole of AS at non-equilibrium.

Increasing the cooling rate or the size of the AS particles increases concentration gradients of AS within the mixture. If the AS concentration in the mixture drops too low, other phases are favored. In relative order, dropping the AS concentration in the mixture first favors the 1:2 salt, then the 1:3 salt and finally $AN_{solid}$. FIG. 4 shows the relative concentration of AS in the mixture (relative to the concentration that would be in equilibrium with $AS_{solid}$) where the 1:2 salt and 1:3 salt are both in equilibrium.

If the AS concentration in the mixture is kept above this ratio, then substantially only 1:2 salt forms on cooling. FIG. 4 shows that more undersaturation of AS (relative to $AS_{solid}$) is possible at lower temperatures without forming 1:3 salt. Therefore, mass transfer limitations and the corresponding formation of 1:3 salt or $AN_{solid}$ are reduced when crystallization is reduced to lower temperatures. FIG. 2, on the other hand, shows that increased water levels have two beneficial effects: the temperature range over which the crystallization occurs is increased which accommodates more rapid cooling; and crystallization is postponed to lower temperatures which accommodates lower concentrations of AS (relative to saturation with $AS_{solid}$) and, thus, reduces mass transfer limitations on formation of the desired 1:2 salt.

We believe that the 1:2 salt is favored over the 1:3 salt at all temperatures when $AS_{solid}$ is present. The 1:2 salt is increasingly favored when the temperature is reduced. While it is possible that at higher temperatures the 1:3 salt is preferred over the 1:2 salt, at lower temperatures such as at 175° C. or less, the 1:2 salt is favored.

Cooling the mixture is an important step and is one of the variables that are important: the amount of water (increasing water content), AS particle size (reduced size) and cooling rate (reduced cooling rate). The temperature range over which the cooling rate is important widens with increasing water content. To maximize water content, it can be desirable to reduce the temperature at which AN and AS are mixed. The mixing may be performed in open atmospheric vessels and that sets the maximum water content to be the amount of water that is in equilibrium with water vapor at 1 atm.

Thus, those skilled in the art can produce ammonium nitrate double salts, preferably ammonium nitrate sulfate 1:2 double salt by mixing AN, AS and water together at a temperature less than about 175° C. This mixing can be achieved in a number of ways. For example, water can be added to AN granules which are then heated to no more than about 175° C. Then, AS can be added to the water AN mixture. The AS can be added quickly and preheated. The mixture of AN, water and AS may be stirred continuously with a stirrer at about 100 to about 300 rpm so that a homogeneous composite is formed. The mixing time can be measured in minutes or hours depending on the speed at which the various materials are mixed. Shorter times are preferred for manufacturing efficiency purposes. Also, rapid mixture assists in increasing the percentage of 1:2 ANS salts. This is helpful since increasing 1:2 double salts are preferred over 1:3 double salts and is preferred because it reduces the amount of unreacted AN and AS.

Figure 5:
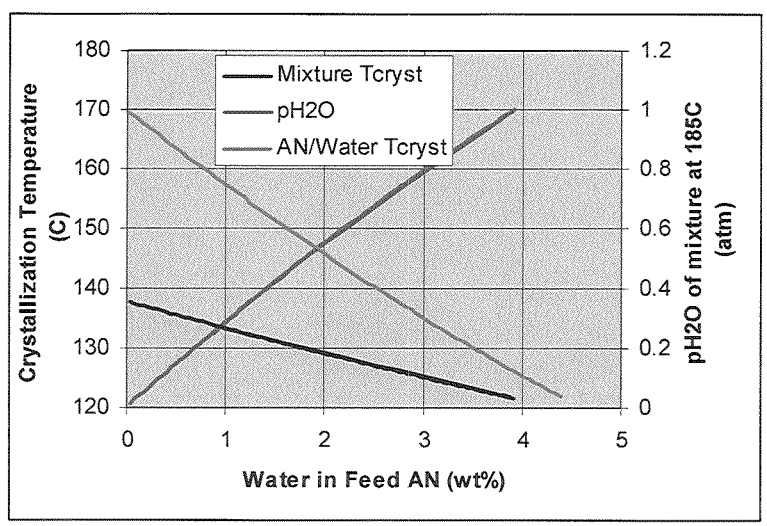

In one example, an equimolar amount of AN and AS is mixed together. The amount of added water can be varied so long as it is greater than about 2 wt %. The preferred temperature which is less than about 175° C. an be determined by the amount of water added. This is shown in FIG. 5. In particular, an equimolar mixture of AN and AS may be combined. The temperature of the combined mixture is preferably above the crystallization temperature of the 1:2 double salt which is a function of water content.

Most preferably, the temperature of the combined mixture is 10 to 20° C. above the crystallization temperature for the 1:2 double salt. FIG. 5 shows that as the water is increased AN can start out at a lower temperature which improves process safety. The mixture of AN, AS and water can then be formed into the desired particle size, typically about 1 to about 3 mm, by using prilling and/or granulation. U.S. Pat. No. 7,175,684, the subject matter of which is incorporated by reference, discloses one such process that can be used to prill high viscosity, shear thinning, mixtures of AS and AN. Prilled particles or recycled smaller diameter product can be used as seed for a granulation process. The material from granulation or prilling is cooled at a controlled rate less than about 100° C. to promote production of the desired 1:2 double salt.

Figure 6:
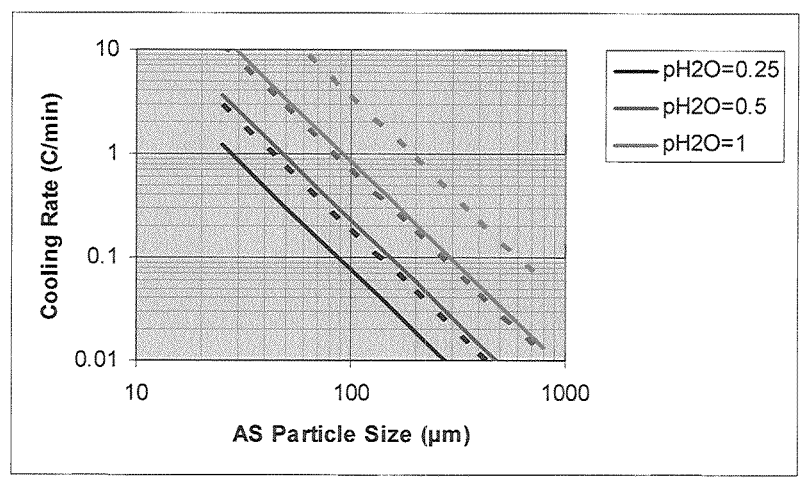

FIG. 6 shows maximum crystallization rates as a function of particle size and initial water content. The solid lines give the maximum initial rate when only a small amount of the double salt has formed and the dashed lines give the maximum cooling rate when 90% of the double salt has formed. The solid lines can be fit within 10% by Equation 1

$$\text{Cooling Rate} = \frac{{}^W\text{H}_2\text{O}^{1.6}}{930\, d^2} \quad (1)$$

The dashed lines can be fit within 10% by Equation 2.

$$\text{Cooling Rate} = \frac{{}^W\text{H}_2\text{O}^2}{2400\, d^2}, \quad (2)$$

where Cooling Rate is the maximum cooling rate in C/min, $w\text{H}_2\text{O}$ is the weight percent water in the feed on an AN basis (i.e., Water in Feed/AN in Feed*100%), and d is the initial average diameter of the AS particles in μm. The water content corresponding to the different water partial pressures can be read from FIG. 5. Equations 1 and 2 provide one possible means for determining how to adjust cooling rate based on desired water concentrations and AS particle size. Equations 1 and 2 may be used as a guide in establishing operating conditions. Those skilled in the art will appreciate that Equations 1 and 2 are not necessarily reflective of variations in production and the optimal cooling rates may deviate from those given.

Based on the amount of water used, it may be desirable to dry the product during or after crystallization. Optionally, ferric and aluminum salts can be added to the initial slurry or during drying. These salts are known to form hydrates which melt over the temperature range of interest (see Table 1). Formation of ambient temperature hydrates ties up water and allows a product that has lower amounts of free water which can negatively impact strength and agglomeration. The amount of ferric and/or aluminum salts should be set so that the corresponding hydrates consume 0 to about 200% of the remaining water.

TABLE 1

Melting points of Ferric and Aluminum Sulfate and Nitrate Hydrates $FeNH_4(SO_4)_2\ 12H_2O$, mp 40 C.
$Fe(NO_3)_3\ 9H_2O$, mp 47 C.
$Al(NO_3)_3\ 9H_2O$, mp 70 C.
$Al_2(SO_4)_3\ 18H_2O$, mp 88 C.

Examples

We produced 10 ANS specimens according to the methods described above. Equimolar amounts of AN and AS were mixed in 2 wt % water at less than 175° C. A series of ten (10) of ammonium composite samples (Sample ID 1-10) were tested on X-ray diffraction (XRD) equipment. The results are shown in Table 2 and confirm the crystaligraphic characteristics of our composite materials.

TABLE 2

Quantitative XRD Ammonium Nitrate/Ammonium Sulfate Worksheet

| ASN PELLET | Peak Information | | Fit Results | | | | | | | | | | | | | | | | | |
|---|---|---|---|---|---|---|---|---|---|---|---|---|---|---|---|---|---|---|---|---|
| | Phase | Typical Peak Position | # | G | K | & | 2θ | F | Intensity | F | FWHM | F | Asymm | F | u & e | F | a2/a1 | F | Integration |
| Sample ID 1 | | | | | | | | | | | | | | | | | | | | |
| 1st Scan | 3:1 | 18.6 | | | | | | | | | | | | | | | | | | |
| | 3:1 + 2:1 | 18.9 | # | # | # | # | 18.855 | # | 6440 | # | 0.130 | # | ## | # | ## | ## | ## | # | 53644 |
| | | 19.1 | # | # | # | # | 19.331 | # | 387 | # | 0.192 | # | ## | # | ## | ## | ## | # | 4767 |
| | 3:1 | 19.5 | # | # | # | # | 19.540 | # | 621 | # | 0.127 | # | ## | # | ## | ## | ## | # | 5047 |
| | AS | 20.2 | 4 | 1 | 1 | 0 | 20.127 | 1 | 4170 | 1 | 0.162 | 1 | 5 | 0 | 2 | 0 | 1 | 0 | 43152 |
| | AS | 20.5 | 5 | 1 | 1 | 0 | 20.382 | 1 | 10105 | 1 | 0.116 | 1 | 5 | 0 | 2 | 0 | 1 | 0 | 74843 |
| 2nd Scan | 2:1 | 30.5 | 1 | 1 | 1 | 0 | 30.399 | 1 | 7634 | 1 | 0.158 | 1 | 5 | 0 | 2 | 0 | 1 | 0 | 77233 |
| | 3:1 | 30.8 | | | | | | | | | | | | | | | | | | |
| | 3:1 + AN | 31.1 | | | | | | | | | | | | | | | | | | |
| | 2:1 | 31.3 | 2 | 1 | 1 | 0 | 31.255 | 1 | 4467 | 1 | 0.151 | 1 | 5 | 0 | 2 | 0 | 1 | 0 | 43184 |
| | 3:1 | 32.2 | 3 | 1 | 1 | 0 | 32.050 | 1 | 348 | 1 | 0.244 | 1 | 5 | 0 | 2 | 0 | 1 | 0 | 5442 |
| | 3:1 | 32.4 | 4 | 1 | 1 | 0 | 32.366 | 1 | 332 | 1 | 0.495 | 1 | 5 | 0 | 2 | 0 | 1 | 0 | 10518 |
| | AN | 32.8 | | | | | | | | | | | | | | | | | | |
| | AS | 33.1 | 5 | 1 | 1 | 0 | 32.992 | 1 | 799 | 1 | 0.1325 | 1 | 5 | 0 | 2 | 0 | 1 | 0 | 6782 |
| | 3:1 | 33.4 | | | | | | | | | | | | | | | | | | |
| | AS | 33.7 | 6 | 1 | 1 | 0 | 33.57 | 1 | 2276 | 1 | 0.1463 | 1 | 5 | 0 | 2 | 0 | 1 | 0 | 21334 |

TABLE 2-continued

Quantitative XRD Ammonium Nitrate/Ammonium Sulfate Worksheet

Sample ID 2

| | | |
|---|---|---|
| 1st Scan | 3:1 | 18.6 |
| | 3:1 + 2:1 | 18.9 |
| | | 19.1 |
| | 3:1 | 19.5 |
| | AS | 20.2 |
| | AS | 20.5 |
| 2nd Scan | 2:1 | 30.5 |
| | 3:1 | 30.8 |
| | 3:1 + AN | 31.1 |
| | 2:1 | 31.3 |
| | 3:1 | 32.2 |
| | 3:1 | 32.4 |
| | AN | 32.8 |
| | AS | 33.1 |
| | 3:1 | 33.4 |
| | AS | 33.7 |

Sample ID 3

| | | |
|---|---|---|
| 1st Scan | 3:1 | 18.6 |
| | 3:1 + 2:1 | 18.9 |
| | | 19.1 |
| | 3:1 | 19.5 |
| | AS | 20.2 |
| | AS | 20.5 |
| 2nd Scan | 2:1 | 30.5 |
| | 3:1 | 30.8 |
| | 3:1 + AN | 31.1 |
| | 2:1 | 31.3 |
| | 3:1 | 32.2 |
| | 3:1 | 32.4 |
| | AN | 32.8 |
| | AS | 33.1 |
| | 3:1 | 33.4 |
| | AS | 33.7 |

Sample ID 4

| | | |
|---|---|---|
| 1st Scan | 3:1 | 18.6 |
| | 3:1 + 2:1 | 18.9 |
| | | 19.1 |
| | 3:1 | 19.5 |
| | AS | 20.2 |
| | AS | 20.5 |
| 2nd Scan | 2:1 | 30.5 |
| | 3:1 | 30.8 |
| | 3:1 + AN | 31.1 |
| | 2:1 | 31.3 |
| | 3:1 | 32.2 |
| | 3:1 | 32.4 |
| | AN | 32.8 |
| | AS | 33.1 |
| | 3:1 | 33.4 |
| | AS | 33.7 |

Sample ID 5

| | | |
|---|---|---|
| 1st Scan | 3:1 | 18.6 |
| | 3:1 + 2:1 | 18.9 |
| | | 19.1 |
| | 3:1 | 19.5 |
| | AS | 20.2 |
| | AS | 20.5 |
| 2nd Scan | 2:1 | 30.5 |
| | 3:1 | 30.8 |
| | 3:1 + AN | 31.1 |
| | 2:1 | 31.3 |
| | 3:1 | 32.2 |
| | 3:1 | 32.4 |
| | AN | 32.8 |
| | AS | 33.1 |
| | 3:1 | 33.4 |
| | AS | 33.7 |

Sample ID 6

| | | |
|---|---|---|
| 1st Scan | 3:1 | 18.6 |
| | 3:1 + 2:1 | 18.9 |
| | | 19.1 |
| | 3:1 | 19.5 |

TABLE 2-continued

Quantitative XRD Ammonium Nitrate/Ammonium Sulfate Worksheet

| | | |
|---|---|---|
| | AS | 20.2 |
| | AS | 20.5 |
| 2nd Scan | 2:1 | 30.5 |
| | 3:1 | 30.8 |
| | 3:1 + AN | 31.1 |
| | 2:1 | 31.3 |
| | 3:1 | 32.2 |
| | 3:1 | 32.4 |
| | AN | 32.8 |
| | AS | 33.1 |
| | 3:1 | 33.4 |
| | AS | 33.7 |
| Sample ID 7 | | |
| 1st Scan | 3:1 | 18.6 |
| | 3:1 + 2:1 | 18.9 |
| | | 19.1 |
| | 3:1 | 19.5 |
| | AS | 20.2 |
| | AS | 20.5 |
| 2nd Scan | 2:1 | 30.5 |
| | 3:1 | 30.8 |
| | 3:1 + AN | 31.1 |
| | 2:1 | 31.3 |
| | 3:1 | 32.2 |
| | 3:1 | 32.4 |
| | AN | 32.8 |
| | AS | 33.1 |
| | 3:1 | 33.4 |
| | AS | 33.7 |
| Sample ID 8 | | |
| 1st Scan | 3:1 | 18.6 |
| | 3:1 + 2:1 | 18.9 |
| | | 19.1 |
| | 3:1 | 19.5 |
| | AS | 20.2 |
| | AS | 20.5 |
| 2nd Scan | 2:1 | 30.5 |
| | 3:1 | 30.8 |
| | 3:1 + AN | 31.1 |
| | 2:1 | 31.3 |
| | 3:1 | 32.2 |
| | 3:1 | 32.4 |
| | AN | 32.8 |
| | AS | 33.1 |
| | 3:1 | 33.4 |
| | AS | 33.7 |
| Sample ID 9 | | |
| 1st Scan | 3:1 | 18.6 |
| | 3:1 + 2:1 | 18.9 |
| | | 19.1 |
| | 3:1 | 19.5 |
| | AS | 20.2 |
| | AS | 20.5 |
| 2nd Scan | 2:1 | 30.5 |
| | 3:1 | 30.8 |
| | 3:1 + AN | 31.1 |
| | 2:1 | 31.3 |
| | 3:1 | 32.2 |
| | 3:1 | 32.4 |
| | AN | 32.8 |
| | AS | 33.1 |
| | 3:1 | 33.4 |
| | AS | 33.7 |
| Sample ID 10 | | |
| 1st Scan | 3:1 | 18.6 |
| | 3:1 + 2:1 | 18.9 |
| | | 19.1 |
| | 3:1 | 19.5 |
| | AS | 20.2 |
| | AS | 20.5 |
| 2nd Scan | 2:1 | 30.5 |
| | 3:1 | 30.8 |
| | 3:1 + AN | 31.1 |

TABLE 2-continued

Quantitative XRD Ammonium Nitrate/Ammonium Sulfate Worksheet

| | |
|---|---|
| 2:1 | 31.3 |
| 3:1 | 32.2 |
| 3:1 | 32.4 |
| AN | 32.8 |
| AS | 33.1 |
| 3:1 | 33.4 |
| AS | 33.7 |

| ASN PELLET | Fit Results | | | | | Normalization Factor | | | Normalized Intensity | | | Usable (1 = yes) (0 = no) |
|---|---|---|---|---|---|---|---|---|---|---|---|---|
| | bread | ratio | Total area | ove | Bg Res | α1 height | α1 Area | Total Area | Intensity | Integration | Total Area | |
| Sample ID 1 | | | | | | | | | | | | |
| 1st Scan | | | | | | 0.28 | 0.31 | 0.31 | 0 | 0 | 0 | 0 |
| | 0.2 | 0.8 | 78577 | ## | ### | 0.1, 0.38 | 0.09, .42 | 0.09, 0.43 | 16947 | 127724 | 182737 | 1 |
| | 0.2 | 0.8 | 5966 | ## | ### | | | | | | | |
| | 0.2 | 0.8 | 6803 | ## | ### | 0.16 | 0.16 | 0.15 | 3881 | 31544 | 45353 | 0 |
| | 0.2 | 0.8 | 62612 | 0 | 501 | 0.45 | 0.64 | 0.64 | 9267 | 67425 | 97831 | 1 |
| | 0.1 | 0.8 | 110440 | 0 | 491 | 1 | 1 | 1 | 10105 | 74843 | 110440 | 1 |
| 2nd Scan | 0.2 | 0.8 | 113426 | 0 | 744 | 0.52 | 0.62 | 0.61 | 14681 | 124569 | 18594 | 1 |
| | | | | | | 0.49 | 0.42 | 0.42 | 0 | 0 | 0 | 0 |
| | 0.2 | 0.8 | 64055 | 0 | 725 | 0.26 | 0.32 | 0.31 | 17181 | 134950 | 206629 | 1 |
| | 0.3 | 0.8 | 7617 | 0 | 707 | | | | | | | |
| | 0.6 | 0.8 | 14636 | 0 | 700 | | | | | | | |
| | | | | | | 0.81 | 0.89 | 0.89 | 0 | 0 | 0 | 0 |
| | 0.2 | 0.8 | 9829 | 0 | 686 | | | | | | | |
| | 0.2 | 0.8 | 31407 | 0 | 673 | | | | | | | |
| Sample ID 2 | | | | | | | | | | | | |
| 1st Scan | | | | | | 0.28 | 0.31 | 0.31 | 0 | 0 | 0 | 0 |
| | | | | | | 0.1, 0.38 | 0.09, .42 | 0.09, 0.43 | 0 | 0 | 0 | 0 |
| | | | | | | 0.16 | 0.16 | 0.15 | 0 | 0 | 0 | 0 |
| | | | | | | 0.45 | 0.64 | 0.64 | 0 | 0 | 0 | 1 |
| | | | | | | 1 | 1 | 1 | 0 | 0 | 0 | 1 |
| 2nd Scan | | | | | | 0.52 | 0.62 | 0.61 | 0 | 0 | 0 | 0 |
| | | | | | | 0.49 | 0.42 | 0.42 | 0 | 0 | 0 | 0 |
| | | | | | | 0.26 | 0.32 | 0.31 | 0 | 0 | 0 | 0 |
| | | | | | | 0.81 | 0.89 | 0.89 | 0 | 0 | 0 | 0 |
| Sample ID 3 | | | | | | | | | | | | |
| 1st Scan | | | | | | 0.28 | 0.31 | 0.31 | 0 | 0 | 0 | 0 |
| | | | | | | 0.1, 0.38 | 0.09, .42 | 0.09, 0.43 | 0 | 0 | 0 | 0 |
| | | | | | | 0.16 | 0.16 | 0.15 | 0 | 0 | 0 | 0 |
| | | | | | | 0.45 | 0.64 | 0.64 | 0 | 0 | 0 | 1 |
| | | | | | | 1 | 1 | 1 | 0 | 0 | 0 | 1 |
| 2nd Scan | | | | | | 0.52 | 0.62 | 0.61 | 0 | 0 | 0 | 0 |
| | | | | | | 0.49 | 0.42 | 0.42 | 0 | 0 | 0 | 0 |
| | | | | | | 0.26 | 0.32 | 0.31 | 0 | 0 | 0 | 0 |
| | | | | | | 0.81 | 0.89 | 0.89 | 0 | 0 | 0 | 0 |
| Sample ID 4 | | | | | | | | | | | | |
| 1st Scan | | | | | | 0.28 | 0.31 | 0.31 | 0 | 0 | 0 | 0 |
| | | | | | | 0.1, 0.38 | 0.09, .42 | 0.09, 0.43 | 0 | 0 | 0 | 0 |
| | | | | | | 0.16 | 0.16 | 0.15 | 0 | 0 | 0 | 0 |
| | | | | | | 0.45 | 0.64 | 0.64 | 0 | 0 | 0 | 1 |
| | | | | | | 1 | 1 | 1 | 0 | 0 | 0 | 1 |
| 2nd Scan | | | | | | 0.52 | 0.62 | 0.61 | 0 | 0 | 0 | 0 |
| | | | | | | 0.49 | 0.42 | 0.42 | 0 | 0 | 0 | 0 |
| | | | | | | 0.26 | 0.32 | 0.31 | 0 | 0 | 0 | 0 |
| | | | | | | 0.81 | 0.89 | 0.89 | 0 | 0 | 0 | 0 |
| Sample ID 5 | | | | | | | | | | | | |
| 1st Scan | | | | | | 0.28 | 0.31 | 0.31 | 0 | 0 | 0 | 0 |
| | | | | | | 0.1, 0.38 | 0.09, .42 | 0.09, 0.43 | 0 | 0 | 0 | 0 |
| | | | | | | 0.16 | 0.16 | 0.15 | 0 | 0 | 0 | 0 |
| | | | | | | 0.45 | 0.64 | 0.64 | 0 | 0 | 0 | 1 |
| | | | | | | 1 | 1 | 1 | 0 | 0 | 0 | 1 |
| 2nd Scan | | | | | | 0.52 | 0.62 | 0.61 | 0 | 0 | 0 | 0 |
| | | | | | | 0.49 | 0.42 | 0.42 | 0 | 0 | 0 | 0 |
| | | | | | | 0.26 | 0.32 | 0.31 | 0 | 0 | 0 | 0 |
| | | | | | | 0.81 | 0.89 | 0.89 | 0 | 0 | 0 | 0 |
| Sample ID 6 | | | | | | | | | | | | |
| 1st Scan | | | | | | 0.28 | 0.31 | 0.31 | 0 | 0 | 0 | 0 |
| | | | | | | 0.1, 0.38 | 0.09, .42 | 0.09, 0.43 | 0 | 0 | 0 | 0 |
| | | | | | | 0.16 | 0.16 | 0.15 | 0 | 0 | 0 | 0 |

TABLE 2-continued

Quantitative XRD Ammonium Nitrate/Ammonium Sulfate Worksheet

|  |  |  |  |  |  |  |  |
|---|---|---|---|---|---|---|---|
|  |  | 0.45 | 0.64 | 0.64 | 0 | 0 | 0 | 1 |
|  |  | 1 | 1 | 1 | 0 | 0 | 0 | 1 |
|  | 2nd Scan | 0.52 | 0.62 | 0.61 | 0 | 0 | 0 | 0 |
|  |  | 0.49 | 0.42 | 0.42 | 0 | 0 | 0 | 0 |
|  |  | 0.26 | 0.32 | 0.31 | 0 | 0 | 0 | 0 |
|  |  | 0.81 | 0.89 | 0.89 | 0 | 0 | 0 | 0 |
| Sample ID 7 |  |  |  |  |  |  |  |  |
|  | 1st Scan | 0.28 | 0.31 | 0.31 | 0 | 0 | 0 | 0 |
|  |  | 0.1, 0.38 | 0.09, .42 | 0.09, 0.43 | 0 | 0 | 0 | 0 |
|  |  | 0.16 | 0.16 | 0.15 | 0 | 0 | 0 | 0 |
|  |  | 0.45 | 0.64 | 0.64 | 0 | 0 | 0 | 1 |
|  |  | 1 | 1 | 1 | 0 | 0 | 0 | 1 |
|  | 2nd Scan | 0.52 | 0.62 | 0.61 | 0 | 0 | 0 | 0 |
|  |  | 0.49 | 0.42 | 0.42 | 0 | 0 | 0 | 0 |
|  |  | 0.26 | 0.32 | 0.31 | 0 | 0 | 0 | 0 |
|  |  | 0.81 | 0.89 | 0.89 | 0 | 0 | 0 | 0 |
| Sample ID 8 |  |  |  |  |  |  |  |  |
|  | 1st Scan | 0.28 | 0.31 | 0.31 | 0 | 0 | 0 | 0 |
|  |  | 0.1, 0.38 | 0.09, .42 | 0.09, 0.43 | 0 | 0 | 0 | 0 |
|  |  | 0.16 | 0.16 | 0.15 | 0 | 0 | 0 | 0 |
|  |  | 0.45 | 0.64 | 0.64 | 0 | 0 | 0 | 1 |
|  |  | 1 | 1 | 1 | 0 | 0 | 0 | 1 |
|  | 2nd Scan | 0.52 | 0.62 | 0.61 | 0 | 0 | 0 | 0 |
|  |  | 0.49 | 0.42 | 0.42 | 0 | 0 | 0 | 0 |
|  |  | 0.26 | 0.32 | 0.31 | 0 | 0 | 0 | 0 |
|  |  | 0.81 | 0.89 | 0.89 | 0 | 0 | 0 | 0 |
| Sample ID 9 |  |  |  |  |  |  |  |  |
|  | 1st Scan | 0.28 | 0.31 | 0.31 | 0 | 0 | 0 | 0 |
|  |  | 0.1, 0.38 | 0.09, .42 | 0.09, 0.43 | 0 | 0 | 0 | 0 |
|  |  | 0.16 | 0.16 | 0.15 | 0 | 0 | 0 | 0 |
|  |  | 0.45 | 0.64 | 0.64 | 0 | 0 | 0 | 1 |
|  |  | 1 | 1 | 1 | 0 | 0 | 0 | 1 |
|  | 2nd Scan | 0.52 | 0.62 | 0.61 | 0 | 0 | 0 | 0 |
|  |  | 0.49 | 0.42 | 0.42 | 0 | 0 | 0 | 0 |
|  |  | 0.26 | 0.32 | 0.31 | 0 | 0 | 0 | 0 |
|  |  | 0.81 | 0.89 | 0.89 | 0 | 0 | 0 | 0 |
| Sample ID 10 |  |  |  |  |  |  |  |  |
|  | 1st Scan | 0.28 | 0.31 | 0.31 | 0 | 0 | 0 | 0 |
|  |  | 0.1, 0.38 | 0.09, .42 | 0.09, 0.43 | 0 | 0 | 0 | 0 |
|  |  | 0.16 | 0.16 | 0.15 | 0 | 0 | 0 | 0 |
|  |  | 0.45 | 0.64 | 0.64 | 0 | 0 | 0 | 1 |
|  |  | 1 | 1 | 1 | 0 | 0 | 0 | 1 |
|  | 2nd Scan | 0.52 | 0.62 | 0.61 | 0 | 0 | 0 | 0 |
|  |  | 0.49 | 0.42 | 0.42 | 0 | 0 | 0 | 0 |
|  |  | 0.26 | 0.32 | 0.31 | 0 | 0 | 0 | 0 |
|  |  | 0.81 | 0.89 | 0.89 | 0 | 0 | 0 | 0 |

What is claimed is:

1. A method for producing ammonium sulfate nitrate comprising:
   providing a mixture comprising ammonium nitrate, ammonium sulfate, and water wherein a first portion of the ammonium sulfate is dissolved in the ammonium nitrate and water and a second portion of the ammonium sulfate is in a solid phase; and
   solidifying a product comprising a 1:2 ammonium nitrate sulfate double salt from the second portion of ammonium sulfate and the ammonium nitrate of the mixture by cooling at least a portion of the mixture at a rate of less than 100° C./min, wherein the water present in the mixture during the solidification step is at least about 0.5 wt. % based on the total weight of ammonium nitrate, ammonium sulfate and water in the mixture.

2. The method of claim 1, wherein at least one of the mixture and components of the mixture are heated.

3. The method of claim 1, wherein a molar ratio of ammonium sulfate to ammonium nitrate in the mixture is from about 0.9:1 to about 1.1:1.

4. The method of claim 1, wherein the product comprises about 60 to about 100 wt % of ammonium nitrate sulfate double salt.

5. The method of claim 4, wherein the product comprises about 60 to about 90 wt % of 1:2 ammonium nitrate sulfate double salt and 0 to about 5 wt % 1:3 ammonium nitrate sulfate double salt.

6. The method of claim 4, wherein the product further comprises about 5 to about 35 wt % unreacted ammonium sulfate and 0 to about 5 wt % unreacted ammonium nitrate.

7. The method of claim 6, wherein the product comprises less than about 1 wt % ammonium nitrate.

8. The method of claim 6, wherein the ammonium nitrate sulfate double salt comprises a composite of ammonium sulfate crystals imbedded in a matrix.

9. The method of claim 1, wherein an amount of water in the mixture is from about 2% to about 24 wt % based on a total weight of ammonium nitrate, ammonium sulfate and water in the mixture.

10. The method of claim 1, wherein said rate of cooling is at a rate of less than 90° C./min.

11. The method of claim 1, wherein said rate of cooling is at a rate of less than 80° C./min.

12. The method of claim 1, wherein the mixture is provided at a temperature of less than 170° C.

13. The method of claim 1, wherein the mixture is provided at a temperature of less than 160° C.

14. The method of claim 1, wherein the mixture is provided at a temperature of less than 175° C.

15. The method of claim 1, wherein the mixture has a ratio of the first portion of ammonium sulfate to ammonium nitrate that is below 0.5.

16. A method for the production of ammonium sulfate nitrate comprising:
   (a) introducing into a vessel ammonium nitrate particles, ammonium sulfate particles, and water in amounts such that the water content is from about 2 wt % to about 24 wt % based on the total weight of ammonium nitrate, ammonium sulfate and water introduced into the vessel to form a mixture;
   (b) dissolving a first portion of the ammonium sulfate into the ammonium nitrate; and
   (c) crystallizing, from the ammonium nitrate and a second portion of the ammonium sulfate not dissolved into the ammonium nitrate, a product comprising 1:2 ammonium nitrate sulfate double salt by cooling at least a portion of the mixture at a rate of less than 100° C./min.

17. The method of claim 16, wherein a molar ratio of ammonium sulfate to ammonium nitrate in the mixture is from about 0.9:1 to about 1.1:1.

18. The method of claim 17, wherein the ammonium sulfate and the ammonium nitrate are of at least about 95 wt % purity.

19. The method of claim 17, wherein the method is a continuous process.

20. The method of claim 16, wherein said dissolving step further comprises heating the mixture at a temperature of less than 175° C.

* * * * *